E. E. SLICK.
SIX WHEEL TRUCK.
APPLICATION FILED JAN. 8, 1918. RENEWED DEC. 20, 1918.
1,292,900.
Patented Jan. 28, 1919.
2 SHEETS—SHEET 1.
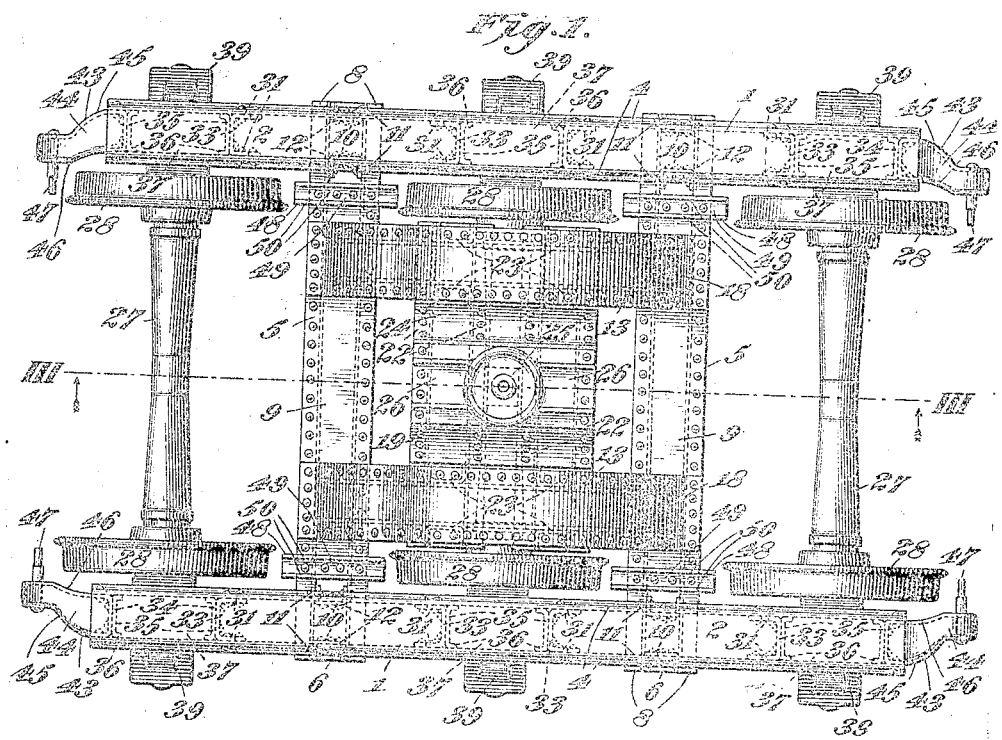
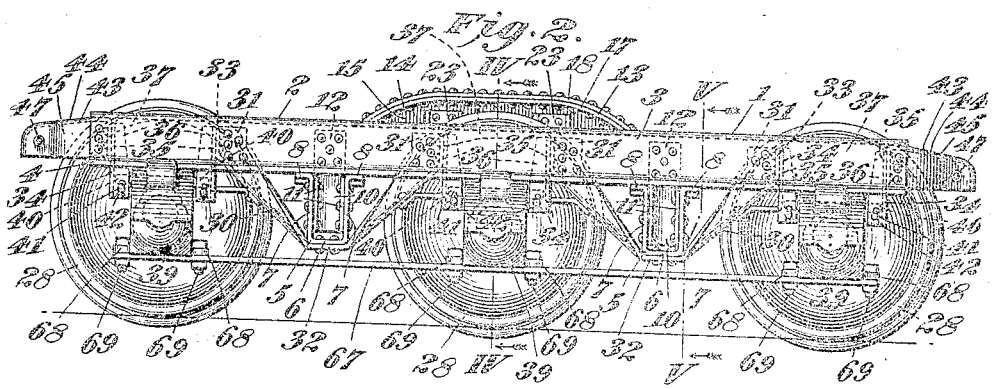
INVENTOR
Edwin E. Slick.
BY
Geo. E. Thackray
ATTORNEY

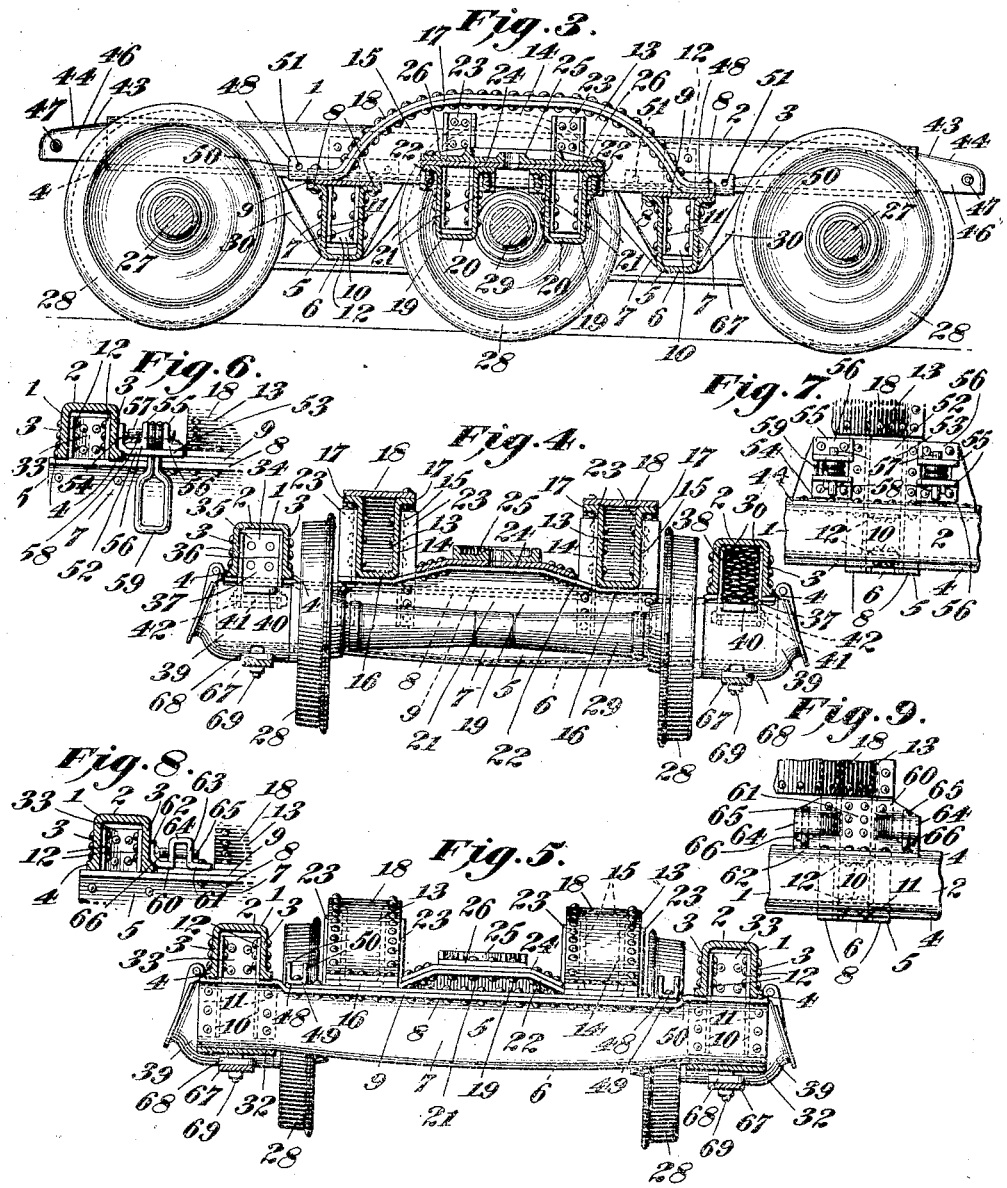

UNITED STATES PATENT OFFICE.

EDWIN E. SLICK, OF WESTMONT BOROUGH, PENNSYLVANIA.

SIX-WHEEL TRUCK.

1,292,900.  Specification of Letters Patent.  Patented Jan. 28, 1919.

Application filed January 8, 1918, Serial No. 210,907. Renewed December 20, 1918. Serial No. 267,733.

*To all whom it may concern:*

Be it known that I, EDWIN E. SLICK, a citizen of the United States, and a resident of the borough of Westmont, county of Cambria, and State of Pennsylvania, (whose post-office address is Johnstown, Pennsylvania,) have invented certain new and useful Improvements in Six-Wheel Trucks; and I do hereby declare the following to be a full, clear, and exact description of the invention, such as will enable others skilled in the art to which it appertains to make and use the same.

My invention relates to trucks for railway cars, with particular reference to six-wheel trucks adapted to carry very heavy loads, while at the same time constructed in as simple and direct a manner as possible and of the fewest parts.

One of the objects of my invention is to provide a truck of the character described without equalizing bars or movable levers to transmit the load from the car body to the wheels, and also to provide a structure which is stiff, strong and so proportioned that it is unnecessary to arrange the transoms or equivalent portions at different distances from the pairs of end wheels as compared with their distances from the center wheels in the attempt to equalize the loading on the various wheels.

I also provide side frames so constructed and braced that the load from the car body is distributed on the six wheels so that each of the wheels has to carry substantially the same load and its due proportion of the total. In order to facilitate this, I provide springs of ample capacity but of sufficient yielding movement, preferably over each of the journal boxes, so that if, on account of the irregularities in the track, one or a pair of the wheels is disposed to assume more than its due share of the load, the springs above it will yield, thus allowing the other wheels to take their shares of the load and thereby equalize the load pressure on each of the wheels.

Another object of my invention is to provide inner arch bars or arches of simple but strong construction, adapted to transmit the load from the bolster to the side frames through the transoms in the simplest way.

Another object of my invention is to so arrange the truck framing that the central pair of wheels and their axle, as well as the other wheels and axles, may be easily removed from the truck without disassembling the truck frame.

My invention also comprises other objects as will hereinafter more fully appear.

Having thus given a general description of my invention, I will now, in order to make the matter more clear, refer to the annexed two sheets of drawings, which form part of this specification, and in which like characters refer to like parts.

Figure 1 is a plan view of my truck as a whole; Fig. 2 is a side elevation thereof; Fig. 3 is a longitudinal sectional elevation on the line III—III of Fig. 1; Fig. 4 is a central transverse sectional elevation on the line IV—IV of Fig. 2; Fig. 5 is a transverse sectional elevation on the line V—V of Fig. 2; Fig. 6 is a transverse sectional elevation through the wheel piece, showing a slightly modified form of brace plate connecting the transom to the wheel piece and also showing a modified form of brake hanger support; Fig. 7 is a plan view of the portions corresponding to those shown in Fig. 6; Fig. 8 is a transverse sectional elevation through the wheel piece showing another slightly modified form of combined brace plate and brake hanger support; and Fig. 9 is a plan view of the portions shown in Fig. 8.

Referring now to the characters of reference on the drawings:—1 is the wheel piece, which is of inverted trough section provided with upper flange 2, web portions 3 and slightly projecting lower lateral flanges 4; 5 are the truck transoms, each composed of a deep trough section provided with a lower flange 6, side web portions 7 and upper laterally projecting side flanges 8, these transoms being provided with top cover plates 9 riveted thereto as shown. These truck transoms are secured to the underside of the wheel pieces 1 by means of the channel shaped hangers 10, the flanges 11 of which are riveted to the webs of each of the transoms as shown, while the channel webs 12 are riveted to the webs 3 of the wheel pieces; 13 are the inside arch bars or arches, each being composed of a trough shaped portion 14, provided with the webs 15, lower flange 16, upper laterally projecting flanges 17 and cover plate 18 riveted thereto. This arch is formed of a trough shaped piece 14, which is preferably made of pressed steel, deeper at the center and curving downwardly at the ends to resemble an arch, thus making a structure which is very stiff and strong, being the deepest where the bending stresses are greatest and reducing in depth toward the ends where the bending stresses are the least. The ends of these arches 13 rest upon and are secured to the transoms 5 as illustrated. These inside arch bars or arches are also adapted to receive side bearings on the outer portions of their upper faces, smooth portions being provided in this location as shown for this purpose. Any form of side bearing may be mounted on these arch bars and I have therefore not illustrated this detail.

The central transverse bolster is formed of a pair of trough sections 19, each provided with a lower flange 20, side webs 21, upper laterally projecting flanges 22 and with a cover plate 24 riveted to the lateral flanges as shown. The trough sections of the bolster are connected to the inside arch bars or arches by the channel or trough shape hangers 23, the webs of which are riveted to the webs 15 of the arches and the flanges of which are riveted to the webs 21 of the bolster. On the upper central portion of this bolster, I mount a center plate 25, provided with extending portions 26, which are riveted to the outer lateral flanges of the bolster, as indicated. It should be noted that I use two trough shaped members for the central bolster, one arranged on each side of the center axle of the car and no portion of this bolster or other part of the truck frame passes below the axles, thus allowing the center pair of wheels and their axle to be removed from the truck in a similar manner to that of removing the end axles, and this is a feature of my invention, as it conduces to ease and economy of maintenance and repairs.

The end axles are 27, the wheels are 28, and the central axle is 29. The side frames are each composed of a wheel piece 1 of inverted trough shape, as heretofore described, with the transoms hung securely to and below the same, and in addition to these portions, I also provide diagonal brace or tension members 30, the upper portions of which are of trough section, with their flanges 31 riveted to the webs 3 of the wheel piece 1, this trough portion gradually merging into a flat portion 32, which is arranged to contact with the lower flange 6 of the transoms and may be riveted thereto, as shown, or may merely contact with the lower portion of the transoms if desired. The construction of this tension member 30 is such that it is very well adapted to its purpose, the flange portions 31 being adapted to contact directly with the webs of the wheel piece, while the lower flat portion is adapted to contact directly with the lower flange of the transom and to be secured thereto, and the construction is such that the channel or trough shaped portion merges gradually into the flat portion, as illustrated. This makes a very stiff and strong structure, one of good appearance which is also adapted for use in four wheel trucks. The web portion of the upper ends of the tension member is indicated as 33. Immediately adjacent the upper ends of the tension members 30 I provide trough shaped guide bars 34, each having a web portion 35 and flanges 36, which latter are adapted to be riveted to the webs 3 of the wheel piece 1. These flanges 36 are preferably secured by means of countersunk rivets, so as to provide flush surfaces on their interior, and these, together with the surfaces of the webs of the wheel pieces, provide spring pockets 37, one over each journal box. In each of these spring pockets I mount journal box springs, which may be of any form, but I have illustrated in Fig. 4 my corrugated friction springs 38, which are fully described in my prior Patent No. 1,138,632, dated May 18, 1915. The springs in these pockets are of such design as to have ample movement in use, while at the same time they are of strength sufficient to carry the loads imposed upon them, and as the truck passes over the track, each of the springs yields to a greater or less extent, depending upon the amount of irregularity which it meets; so that the loads are virtually equalized on each of the journals and wheels, and this is possible by reason of the strength and stiffness of the side frame, due to the wheel piece 1, the brace and tension members 30 and their attachments. By mounting the springs in these pockets, they are also protected from the weather, accumulations of water, snow, ice, dust or other materials and are consequently in good condition for performing their functions at all times.

For the sake of clearness of illustration, I have only shown one set of springs, but wish it understood that similar friction springs are provided in each of the pockets 37.

Another feature of my invention is that my truck is adapted to utilize standard journal boxes 39, the upper sides of which are provided with projecting lugs 40, the edges of which are adjacent to and held in relative position by the guide bars 34. For the purpose of retaining the journal boxes in the truck, the lower ends of the flanges of the guide bars 34 are provided with holes and the bolts 41 are inserted therethrough and held in position by means of the split keys 42. By reason of this construction the entire truck frame with its wheels and axles can be lifted and moved as a whole when desired, and when it is necessary to remove a pair of wheels and their axle and journal boxes, the bolts 41 are withdrawn and the truck can be then lifted from any pair of wheels and axles.

43 is a bracket extension, preferably formed of pressed steel, provided with a top flange 44, webs 45 and 46, the webs being secured to the webs of the wheel piece 1 by rivets, as shown, the outer end of the bracket being offset, as illustrated, and provided with holes through its webs, in which is inserted and secured the brake beam hanger carrier 47. As illustrated in Fig. 1, I provide intermediate brake beam hangers 48, each being of trough or channel form, provided with a web 49, which is riveted to the top of the transom, and flanges 50, the ends of which are provided with perforations 51 adapted to receive a bolt to carry one of the usual forms of brake beam hangers; and as compared with other constructions, this is a very simple and strong brake beam hanger support. As illustrated in Figs. 6 and 7, I provide a bent gusset plate 52, the flat portion 53 of which is trapezoidal in form and riveted to the top of the transom as illustrated, the flange portion 54 being riveted directly to the web 3 of the wheel piece, as illustrated. This therefore forms a very stiff and efficient brace or gusset plate connection between the transom and the wheel piece, which serves to square the truck and keep it in shape notwithstanding the various stresses to which it may be subjected in traveling on the track, around curves, over switches, frogs, etc. I provide an opening through each end of the plate and on each side of each opening I provide angle brackets 55, the lower legs of which 56 are riveted to the flat part of the plate 52, the upper projecting legs being provided with holes adapted to receive the brake hanger supporting bolt 57, provided with a retaining key 58, and on this bolt is mounted the brake hanger 59.

Referring now to Figs. 8 and 9, this is another modified form of combined brace or gusset plate and brake beam hanger support, composed of the plate 60, the flat portion 61 of which is riveted to the transom as illustrated, and the upper projecting flange 62 is riveted to the web 3 of the wheel piece 1. Near the ends of the plate I provide up-pressed portions, comprising webs 63, and upper flange 64, the webs being perforated as shown and adapted to receive the brake beam hanger bolt 65, which is held in position by the key 66. This plate 61 also forms a stiff and strong connection between the transom and wheel piece and ties the frame securely together, preventing its distortion in service. To the journal boxes I connect a pedestal tie bar 67, secured to the lugs 68 of the journal boxes by means of the bolts 69. It will be noted that there is a clearance or space between this pedestal tie bar and the lower surface 32 of the tension or bracing member to allow for the spring movement of the truck frame on the journal boxes.

Although I have described and illustrated my invention in considerable detail, I do not wish to be limited to the exact and specific details thereof as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a car truck side-frame, a wheel piece of inverted trough section, a transom projecting below and secured thereto, a diagonal brace secured to said wheel piece on each side of and provided with an intermediate flat portion contacting with the lower portion of the transom.

2. In a pedestal car truck, a wheel piece extending longitudinally adjacent the wheels, a transverse transom secured to and extending below the wheel piece, a diagonal brace and tension member provided with flanges secured to the wheel piece on each side of said transom and a flattened central portion adapted to support the same.

3. In a pedestal car truck, a longitudinal wheel piece, a transverse transom, the end portion of which abuts and projects below the same, a diagonal tension member provided with flanges secured to the wheel piece on each side of said transom and a flattened intermediate portion contacting with the lower portion of the end of the transom.

4. In a car truck, a wheel piece comprising an inverted trough section, a transom secured to and extending below said wheel piece, a diagonal brace member, the upper portion of which is of trough section, with its flanges secured to the webs of said wheel piece, the lower portion of the tension member being flattened and contacting with the lower end portion of said transom.

5. In a car truck, a wheel piece comprising an inverted trough section, a transom secured to and extending below said wheel piece, a diagonal brace member, the upper portion of which is of trough section, with its flanges secured to the inner sides of the webs of said wheel piece, the lower portion of the tension member being flattened and contacting with the lower portion of the transom.

6. In a car truck, a wheel piece of inverted trough section, a transom of trough section extending transversely of said wheel piece below the same and secured thereto, a diagonal tension member, the upper portion of which is of trough section, the flanges of which are secured to the webs of the wheel piece on each side of the transom, the lower portion of said tension member being flattened and in contact with the lower part of said transom.

7. In a car truck, a longitudinal wheel piece of inverted trough section, a transverse transom of trough section, the ends of which are secured to and below said wheel piece by means of one or more hangers, the flanges of which are secured to the webs of the transom, the web of which is secured to the web of the wheel piece.

8. In a car truck, a wheel piece of inverted trough section with lower lateral flanges extending outwardly, a transom transversely thereof and secured thereto by one or more hangers, the flanges of which are secured to the flanges of the transom and the web of which is secured to the web of the wheel piece, a diagonal tension member, whose upper part is of trough section, the flanges of which are nested within and secured to the webs of the wheel piece, the tension member gradually merging therefrom into a lower flat portion, which is in contact with the lower portion of the end of the transom.

9. In a six-wheel car truck, a wheel piece extending longitudinally on each side thereof, a pair of transoms extending transversely of the truck, the ends of which are secured to said wheel pieces, a pair of inner arch members, each comprised of a trough shaped member provided with a lower flange, and web portions, of less depth at their ends than at their center, the ends being supported by the transoms, and a bolster extending transversely of the truck and supported by said arch members.

10. In a six-wheel car truck, a wheel piece extending longitudinally on each side thereof, a pair of transoms extending transversely of the truck, the ends of which are secured to said wheel pieces, a pair of inner arch members, each comprised of a trough shaped member provided with a lower flange and side web portions, of less depth at their ends than at their center, the ends being supported by the transoms, and a bolster comprised of two trough members, one on either side of the center axle and supported by said arch members, whereby the center pair of wheels, as well as the end pairs, are removable without disassembling the framework of the truck.

11. In a truck frame, a pair of wheel pieces of inverted trough section, a pair of transoms extending transversely thereof and secured thereto, a pair of longitudinally extending arch members, each composed of a trough section with laterally extending flange portions, deeper at the middle than at the ends, which are supported by the transoms, and a transverse truck bolster supported by said arch members.

12. A six-wheel truck frame, comprising a pair of wheel pieces of inverted trough section, a pair of transoms arranged transversely thereof and extending between the center and end wheels, said transoms being secured to and supported by said wheel pieces, a pair of arch members of trough section, deeper at the center than at their ends, which are secured to and supported by the transoms aforesaid, a bolster comprised of a pair of trough sections spaced apart, one on each side of the central axle, whereby the wheels and axles may be placed and replaced without disturbing the truck frame.

13. In a truck frame, a wheel piece of inverted trough section, a plurality of pairs of guides secured to the inner surfaces of the webs whereof and extending below said wheel pieces, a journal box arranged between each pair of guides adapted to move upwardly and downwardly relative thereto, and removable means adapted to retain the journal boxes within the guides.

14. In a car truck, a pair of wheel pieces of inverted trough section, a pair of transoms of trough section, the ends of said transoms being adjacent to the under surfaces of said wheel pieces and secured thereto by means of flanged members, the flanges of which are nested within and secured to the webs of the transom, the webs of said flange members contacting with and secured to the webs of the wheel pieces.

15. In a truck frame, a wheel piece of inverted trough section, guide pieces inserted within said trough and secured thereto, said guides and the trough sides being thereby adapted to form spring pockets.

16. In a truck frame, a wheel piece of inverted trough section, guide members spaced apart and secured within said trough section and adapted to form spring pockets therewith, the lower ends of said guide members projecting downwardly and provided with retainers adapted to receive and retain journal boxes.

17. In a truck frame of the character described, an arch member extending longitudinally thereof, a transverse trough shaped bolster secured to and below said arch member by means of one or more channel-shaped hangers, the web of which is secured to the side of the arch member and the flanges of which are secured within and to said bolster.

18. In a truck frame of the character described, a pair of arch members, each composed of a trough section provided with a lower flange and web portions extending upwardly therefrom, a bolster comprising a pair of trough sections spaced apart one on each side of the central axle, said bolster and arch members being secured together by means of channel hangers, the webs of which are secured to the webs of the arch members and the flanges of which are secured within and to the webs of the bolsters.

19. In a truck frame of the character described, a wheel piece, a transom extending transversely thereof and secured thereto, a connection or gusset plate, having a flat portion secured to said transom and provided with an upturned flange portion secured to said wheel piece, and brake hanger supporting means carried by said gusset plate.

20. In a truck frame of the character described, a wheel piece, a transom extending transversely of and supported thereby, a gusset plate secured on and near the end of said transom and provided with an upturned flange secured to said wheel piece, openings in the ends of said gusset plate, angle brackets secured adjacent to said openings provided with holes in their upstanding legs adapted to receive pins to support the brake beam hangers.

21. In a truck frame of the character described, a wheel piece, a transom extending transversely thereof and secured thereto, a gusset plate secured near the ends of said transom and provided with a flanged portion secured to said wheel piece, up-pressed integral portions on said gusset plate, openings in the sides of said up-pressed portion adapted to receive a bolt to support a brake beam hanger.

22. In a six-wheel truck frame, a pair of wheel pieces, a pair of transoms of inverted trough section with flanges extending outwardly from their upper edges, secured thereto and extending between the center and the end pairs of wheels, a pair of longitudinal arch members near said wheel pieces, the ends of which are secured to and supported by the transoms, a bolster extending transversely of and supported by said arch members, said bolster being composed of two members, one on each side of the central axle.

23. In a truck frame, wheel pieces of inverted trough shape, transoms of trough form extending transversely thereof and secured thereto, guide members secured within said wheel pieces and adapted to form spring pockets, springs mounted in said pockets and adapted to transmit the car load to the journal boxes.

24. In a truck frame, wheel pieces of inverted trough shape, transoms of trough form extending transversely thereof and rigidly secured thereto, means for transmitting the car load to said transoms, guide members secured within said wheel pieces and adapted to form spring pockets, springs mounted in said pockets and adapted to transmit the car load to the journal boxes; thereby forming a rigid frame, but adapted to carry approximately the same proportion of the load on each wheel.

25. In a truck frame, a wheel piece of inverted trough form, a pressed steel bracket of hollow box form, the webs of which are within and secured to the webs of said wheel piece and extending from the ends thereof, said bracket being provided with an offset extending inwardly, and a brake beam support secured to said offset portion.

26. In a truck frame, a pair of longitudinal wheel pieces, a pair of transverse truck transoms secured to and below same, channel shaped hangers, the webs of which are secured to the wheel piece and the flanges of which are secured to the transom, a diagonal brace or tension member secured to the wheel piece on each side of the transom, the upper portion of same being of trough shape, and the lower portion flattened and contracting with the bottom portion of the end of the transom.

27. In a truck frame, a pair of wheel pieces of inverted trough section, each provided with an upper flange, two downwardly extending web portions and two lower lateral outwardly extending flanges, a pair of transverse truck transoms secured to said wheel pieces by means of channel shaped hangers, the flanges of which are secured to said transoms and the webs of which are secured to the webs of the wheel pieces, diagonal braces or tension members, the upper ends of which are secured to the wheel pieces on each side of the transoms and the lower portions of which are adapted to contact with, further support said transoms and stiffen the structure.

28. In a truck frame, a wheel piece of inverted trough section having an upper flange, a pair of web portions extending downwardly therefrom, a pair of lower outwardly extending lateral flanges, a transverse transom of upright form, provided with a lower flange, web portions extending upwardly therefrom, a pair of laterally projecting side flanges, a cover plate secured to said flanges, a channel shaped hanger inserted within the openings of the trough sections aforesaid, the flanges of which are secured to the webs of the transom near the ends thereof, the ends of which are secured to the webs of the wheel piece, a diagonal brace member secured to the wheel piece on each side of the transom and extending below the end of said transom and contacting therewith to further support the same and stiffen the structure.

29. In a truck frame, a pair of wheel pieces of inverted trough section, each provided with an upper flange, a pair of web portions extending downwardly therefrom and lower outwardly extending lateral flanges; a pair of trough shaped transverse transoms, each provided with a lower flange, a pair of upwardly projecting web portions, a pair of laterally projecting side flanges, a top cover plate secured to said flanges, said transoms being secured at their ends to said wheel pieces by means of channel shaped hangers inserted within said transoms and wheel pieces, the flanges of which are secured to the webs of the transoms and the webs of which are secured to the webs of the wheel pieces, a diagonal brace and tension member secured to the wheel piece on each side of the transom and extending downwardly thence and contacting with the lower portion of the end of the transom, to further support it and to strengthen and stiffen the structure.

30. In a truck frame, a pair of wheel pieces, a pair of transverse transoms, the ends of which are secured to the edges of said wheel pieces, each transom comprising a trough section having a lower flange, a pair of upwardly extending web portions, a pair of upper laterally projecting side flanges, hangers secured to said wheel pieces and to the ends of said transoms, diagonal brace and tension members secured to the wheel pieces on each side of said transoms and extending below and contacting with the ends thereof to further support the same.

31. In a truck frame, a pair of wheel pieces, a pair of transverse truck transoms of upright trough section, each having a lower flange portion, a pair of upwardly projecting web portions, a pair of outwardly extending lateral flanges, a top cover plate secured to said flanges, the ends of said transoms being secured to said wheel pieces by means of channel shaped hangers, the flanges of which are secured to the insides of the webs of the transoms and the webs of which are secured to the insides of the webs of the wheel pieces, a diagonal brace and tension member secured to the wheel pieces on each side of each transom, the intermediate portion of said brace contacting with the lower portion of the end of said transom and adapted to further assist in supporting the same.

32. In a car truck, a wheel piece of inverted trough section, a truck transom of trough section with a lower flange portion, side web portions, upper outwardly projecting flanges, a top cover plate secured to said flanges, said transom being secured to said wheel piece by means of flanged hangers with their flanges secured to the transom webs and their webs secured to the webs of the wheel piece, a diagonal brace and tension member secured to said wheel piece on each side of the transom, the upper portion of said tension member being of trough shape with its flanges secured to the webs of the wheel piece, the lower portion of said tension member being flattened, contacting with and aiding in the support of the transom.

33. In a car truck, a wheel piece of inverted trough section, provided with an upper flange portion, two side web portions, a pair of small flanges extending outwardly from the lower parts of the web portions, a bracket extension of general inverted trough section, the end portion of the webs of which are nested within the end portions of the webs of the wheel piece and secured thereto, the outer portion of said bracket being offset inwardly toward the wheel tread, a brake beam hanger carrier comprising a shouldered bolt with a cylindrical end portion secured to and extending from the webs of the bracket extension.

34. In a car truck, a pair of wheel pieces of inverted trough section, a pair of truck transoms extending transversely thereof and secured thereto by means of channel shaped hangers, diagonal brace and tension members secured to said wheel pieces on each side of said transoms, extending below and contacting with the ends thereof, inside arches resting on said transoms, and a central transverse bolster carried by said arches.

35. In a car truck, a pair of wheel pieces of inverted trough section, a pair of transverse bolsters below and secured to said wheel pieces by means of flanged hangers secured to their respective webs, diagonal brace and tension members secured to the wheel pieces on each side of the transoms, the intermediate parts of which contact with and further support the ends thereof, a pair of intermediate arch bars supported on said transoms and a central transverse bolster secured to and below said arches.

36. In a car truck, a pair of wheel pieces, a pair of transverse transoms extending below the same, flanged hangers secured to their respective webs, a diagonal brace and tension member for each end of each transom, said brace comprising an upper portion of channel form, the flanges of which are secured within and to the webs of the wheel pieces, the intermediate portion of each being flattened and contacting with and secured to the lower flange of the transom, a pair of inside arches carried by said transoms and a central transverse bolster carried by said arches.

37. In a car truck, a pair of wheel pieces of inverted trough section comprising an upper flange, two side web portions and two small outwardly extending flanges, a pair of transoms extending transversely thereof and secured thereto by means of flanged members secured to their respective webs, a diagonal tension and brace member secured on each side of each transom, the upper portion of the same being of trough section, the flanges of which are secured within and to the webs of the wheel pieces, the intermediate portion being flattened and contacting with the lower portion of the end of said transom, a pair of arch members of trough section, deeper at their ends than at the middle, supported on and near the ends of the transoms, each arch member having a lower flange portion, side web portions, upper laterally projecting flanges, a cover plate secured to said upper flanges, and a central transverse bolster provided with a center plate secured thereto, said bolster being supported by said arch members.

38. In a car truck, a pair of longitudinal wheel pieces of inverted trough section, a pair of transverse transoms secured to and below the same, a tension and brace member secured to the wheel pieces on each side of each transom adapted to support the ends thereof, a pair of inside arches supported on said transoms near their ends, a central transverse bolster comprising a pair of trough sections, one on each side of the central axle, each having a lower flange portion, side web portions, upper outwardly extending flanges, a top cover plate secured to said outwardly extending flanges, and channel hangers connecting the arch bars to the transverse bolster.

39. In a car truck frame, a longitudinal wheel piece comprising a straight bar of inverted trough section, spring pockets formed therein, the inner surfaces of which are adapted to contact with and guide the springs, and bracket extensions attached to the ends thereof adapted to carry brake beam hangers.

40. In a car truck frame, a wheel piece comprising a straight rolled bar of inverted trough section having a top flange, side webs with flanged lower edges, and spring pockets formed within the wheel piece, the inner surfaces of which are adapted to contact with and guide the springs.

41. In a car truck frame, wheel pieces each comprising a longitudinal bar of inverted trough section, spring pockets formed therein, the inner surfaces of which are adapted to contact with and guide the springs, transoms connecting the wheel pieces, inner arch bars supported by the transoms and a bolster supported by the arch bars.

42. In a car truck frame, a longitudinal wheel piece of inverted trough section at each side mounted on journal boxes, springs mounted in spring pockets formed in the wheel pieces above each journal box, the inner surfaces of the pockets being adapted to contact with and guide the springs, transoms connecting the wheel pieces, arch bars supported by the transoms and a bolster carried by the arch bars.

43. In a car truck frame, a longitudinal wheel piece of inverted trough section at each side of the truck mounted on journal boxes, guide bars within the wheel pieces at each side of each journal box and extending below the wheel pieces, thereby forming spring pockets above each journal box, transoms connecting the wheel pieces, arch bars supported by the transoms, and a bolster carried by the arch bar.

44. In a car truck frame, a longitudinal wheel piece of inverted trough section at each side of the truck, mounted on journal boxes, guide bars secured within the wheel pieces at each side of each journal box and extending below the said wheel pieces, thereby forming spring pockets in the wheel pieces above each journal box, springs mounted in said pockets, transoms beneath the wheel pieces with their ends attached thereto, arch bars supported by the transoms between the wheel pieces, and a transverse bolster between the transoms beneath the arch bars and attached thereto.

45. In a car truck, a wheel piece of inverted trough section at each side of the truck, transoms of upright trough section with flanges extending outwardly from their upper edges rigidly connecting the wheel pieces, arch bars mounted on and rigidly connecting the transoms, and a bolster between the transoms hung below and carried by the arch bars and rigidly attached thereto.

46. In a car truck, a wheel piece at each side thereof, transoms beneath and rigidly secured to and connecting the wheel pieces, arch bars above the transoms with their ends rigidly mounted on the transoms, and a bolster beneath the arch bars between the transoms and secured to the arch bars.

47. In a car truck frame, a longitudinal wheel piece of inverted trough section at each side thereof, transoms secured to and beneath the wheel pieces, diagonal tension members secured to the ends of the transoms, and to the wheel pieces, arch bars above the transoms having their ends resting on and rigidly attached thereto, a bolster beneath the arch bars between the transoms and hangers rigidly securing the ends of the bolster to the arch bars.

48. In a car truck, a wheel piece at each side thereof, transoms of trough section secured to and beneath the wheel pieces, diagonal tension members secured to the ends of the transoms and to the wheel pieces, arch bars of trough section having their ends resting on and rigidly attached to the transoms, a bolster beneath the arch bars between the transoms and a plurality of hangers adapted to rigidly secure the bolster to the arch bars.

49. In a car truck, a wheel piece at each side thereof, each comprising a rolled longitudinal bar of inverted trough section, transoms of trough section of varying depth secured to and beneath the wheel pieces, diagonal tension members and hangers secured to the ends of the transoms and to the wheel pieces, arch bars of trough section of varying depth, having their ends resting on and rigidly attached to the transoms; a bolster beneath the arch bars between the transoms and a plurality of hangers adapted to rigidly secure the bolster to the arch bars.

50. In a car truck, a wheel piece at each side thereof, transoms spaced apart and rigidly connecting the wheel pieces, arches of trough section of varying depth having their ends resting on and rigidly attached to the transoms, a bolster composed of a pair of trough shaped members spaced apart and of varying depth with outwardly extending flanges along their upper edges beneath the arch bars between the transoms, a plurality of hangers adapted to rigidly secure the ends of the shaped bolster members to the arch bars.

In testimony whereof I hereunto affix my signature.

EDWIN E. SLICK.